United States Patent
Reddy et al.

(10) Patent No.: US 9,742,228 B2
(45) Date of Patent: Aug. 22, 2017

(54) TORQUE RIPPLE REDUCTION IN ELECTRIC MACHINES

(71) Applicant: GENERAL ELECTGRIC COMPANY, Schenectady, NY (US)

(72) Inventors: Patel Bhageerath Reddy, Niskayuna, NY (US); Kum-Kang Huh, Niskayuna, NY (US); Ayman Mohamed Fawzi El-Refaie, Niskayuna, NY (US); Steven Joseph Galioto, Waterford, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 952 days.

(21) Appl. No.: 14/057,591

(22) Filed: Oct. 18, 2013

(65) Prior Publication Data
US 2015/0108868 A1    Apr. 23, 2015

(51) Int. Cl.
*H02K 1/27*    (2006.01)
*H02K 29/03*   (2006.01)
(Continued)

(52) U.S. Cl.
CPC ........... *H02K 1/27* (2013.01); *H02K 1/146* (2013.01); *H02K 1/2733* (2013.01);
(Continued)

(58) Field of Classification Search
CPC ........ H02K 1/27; H02K 1/146; H02K 1/2773; H02K 29/03; H02K 2213/03
(Continued)

(56) References Cited

U.S. PATENT DOCUMENTS

| 5,818,140 A | 10/1998 | Vagati |
| 6,380,658 B1 | 4/2002 | Sebastian et al. |

(Continued)

FOREIGN PATENT DOCUMENTS

| EP | 2224578 A1 | 9/2010 |
| EP | 2372873 A2 | 10/2011 |

(Continued)

OTHER PUBLICATIONS

D. Salminen et al.,"Torque Ripple of Permanent Magnet Machines with Concentrated Windings," ISEF 2005—XII International Symposium on Electromagnetic Fields in Mechatronics, Sep. 15-17, 2005, 6 pages.

(Continued)

*Primary Examiner* — Terrance Kenerly
(74) *Attorney, Agent, or Firm* — John P. Darling

(57) ABSTRACT

An electric machine, such as an Internal Permanent magnet or Synchronous Reluctance machine, having X phases, that includes a stator assembly, having M slots, with a stator core and stator teeth, that is further configured with stator windings to generate a stator magnetic field when excited with alternating currents and extends along a longitudinal axis with an inner surface that defines a cavity; and a rotor assembly, having N poles, disposed within the cavity which is configured to rotate about the longitudinal axis, wherein the rotor assembly includes a shaft, a rotor core located circumferentially around the shaft. The machine is configured such that a value k=M/(X*N) wherein k is a non-integer greater than about 1.3. The electric machine may alternatively, or additionally, include a non-uniformed gap between the exterior surface of the rotor spokes and the interior stator surface of the stator.

24 Claims, 2 Drawing Sheets

(51) Int. Cl.
*H02K 21/16* (2006.01)
*H02K 1/14* (2006.01)

(52) U.S. Cl.
CPC .......... *H02K 1/2773* (2013.01); *H02K 21/16* (2013.01); *H02K 29/03* (2013.01); *H02K 2213/03* (2013.01)

(58) Field of Classification Search
USPC ............... 310/216.092, 156.46, 216.096
See application file for complete search history.

(56) References Cited

U.S. PATENT DOCUMENTS

| | | | |
|---|---|---|---|
| 7,504,754 | B2 | 3/2009 | Jahns et al. |
| 7,902,710 | B2 | 3/2011 | Han et al. |
| 7,994,668 | B2 | 8/2011 | Gerstler et al. |
| 8,004,140 | B2 | 8/2011 | Alexander et al. |
| 8,154,167 | B2 | 4/2012 | Tang |
| RE44,037 | E | 3/2013 | Tajima et al. |
| 8,421,291 | B2 | 4/2013 | Mantere et al. |
| 2002/0047432 | A1 | 4/2002 | Miyashita et al. |
| 2007/0257576 | A1 | 11/2007 | Adaniya et al. |
| 2008/0093944 | A1* | 4/2008 | Takahashi ............ H02K 1/2766 310/156.02 |
| 2009/0179518 | A1 | 7/2009 | Tajima et al. |
| 2010/0141080 | A1 | 6/2010 | Tang |
| 2010/0277017 | A1* | 11/2010 | Alexander ........... H02K 1/2773 310/61 |
| 2011/0012467 | A1 | 1/2011 | Blissenbach et al. |
| 2011/0133580 | A1* | 6/2011 | Sugimoto ................ H02K 1/20 310/54 |

FOREIGN PATENT DOCUMENTS

| | | |
|---|---|---|
| WO | 2011121184 A1 | 10/2011 |
| WO | 2013054439 A1 | 4/2013 |

OTHER PUBLICATIONS

S. Han et al., "Torque Ripple Reduction in Interior Permanent Magnet Synchronous Machines Using Stators With Odd Number of Slots Per Pole Pair," IEEE Transactions on Energy Conversion, vol. 25, No. 1, Mar. 2010, pp. 1108-1127.

A European Search Report issued in connection with corresponding EP Application No. 14189355.2 on Apr. 1, 2016.

* cited by examiner

TORQUE RIPPLE REDUCTION IN ELECTRIC MACHINES

STATEMENT REGARDING FEDERALLY SPONSORED RESEARCH & DEVELOPMENT

This invention was made with Government support under contract number DE-EE0005573 awarded by U.S. Department of Energy. The Government has certain rights in the invention.

BACKGROUND

The invention relates generally to electric machines, and more particularly, to electric machines such as spoke-type Internal Permanent Magnet (IPM) machines and Synchronous Reluctance machines and a design configuration that effectively addresses torque ripple.

Torque ripple in electric machines, such as spoke-type IPM and Synchronous Reluctance machines, is a concern. Lower torque ripple leads to lessened transient losses in the electric machine as well as smoother reaction to electrical torque inputs.

One technique in reducing torque ripple is by stator shifting by the slot pitch. While this procedure helps reduce torque ripple, the procedure can place unwanted stresses on the insulation material in the slots as well as reducing the torque content in the machine. Stator shifting or stepping over the axial direction creates sharp edges which can cut in to the slot insulation, ultimately affecting the robustness and reliability of the electric machine.

Therefore, it is desirable to improve upon current designs in electric machines, such as spoke-type IPM and Synchronous Reluctance machines, to effectively reduce torque ripple.

BRIEF DESCRIPTION

In accordance with an embodiment of the invention, an electric machine, having X phases, comprises a stator assembly comprising a stator core, the stator core comprising a plurality of stator teeth, the stator assembly is further configured with stator windings to generate a stator magnetic field when excited with alternating currents and extends along a longitudinal axis with an inner surface defining a cavity, said stator assembly having M slots; and a rotor assembly disposed inside said cavity and configured to rotate about the longitudinal axis, said rotor assembly having N poles, wherein the rotor assembly comprises: a shaft; a rotor core located circumferentially around the shaft; and a plurality of permanent magnets disposed between the stacks and are configured to generate a magnetic field, which magnetic field interacts with the stator magnetic field to produce a torque, and further wherein the electric machine comprises a spoke-type Interior Permanent Magnet (IPM) machine and is configured such that a value $k=M/(X*N)$ wherein k is a non-integer>about 1.3.

In accordance with another embodiment, spoke-type internal permanent magnet (IPM) machine having X phases comprises a stator assembly comprising a stator core, the stator core comprising a plurality of stator teeth, the stator assembly having M slots, the stator assembly is further configured with stator windings to generate a magnetic field when excited with alternating currents and extends along a longitudinal axis with an inner surface defining a cavity; and a rotor assembly comprising a rotor core, the rotor assembly having N poles, the rotor assembly disposed inside said cavity and configured to rotate about the longitudinal axis, wherein the rotor assembly further comprises: a shaft; and a plurality of permanent magnets disposed in the rotor core and are configured to generate a magnetic field, which magnetic field interacts with the stator magnetic field to produce a torque, wherein the stator assembly having an inner curved surface, the rotor assembly comprising a plurality of spokes having an outer surface facing the inner curved surface, defining a gap therebetween, wherein the gap has a non-uniform distance along a length of the outer surface.

In accordance with an exemplary embodiment, a electric machine, having X phases, comprises a stator assembly comprising a stator core, the stator core comprising a plurality of stator teeth, the stator assembly is further configured with stator windings to generate a stator magnetic field when excited with alternating currents and extends along a longitudinal axis with an inner surface defining a cavity, said stator assembly having M slots; and a rotor assembly disposed inside said cavity and configured to rotate about the longitudinal axis, said rotor assembly having N poles, wherein the rotor assembly comprises: a shaft; and a rotor core located circumferentially around the shaft, further wherein the electric machine comprises a Synchronous Reluctance machine and is configured such that a value $k=M/(X*N)$ wherein k is a non-integer>about 1.3.

In accordance with an exemplary embodiment, a Synchronous Reluctance machine having X phases comprises a stator assembly comprising a stator core, the stator core comprising a plurality of stator teeth, the stator assembly having M slots, the stator assembly is further configured with stator windings to generate a magnetic field when excited with alternating currents and extends along a longitudinal axis with an inner surface defining a cavity; and a rotor assembly comprising a rotor core and shaft, the rotor assembly having N poles, the rotor assembly disposed inside said cavity and configured to rotate about the longitudinal axis, wherein the stator assembly having an inner curved surface, the rotor assembly comprising a plurality of spokes having an outer surface facing the inner curved surface, defining a gap therebetween, wherein the gap has a non-uniform distance along a length of the outer surface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the invention are directed towards a design methodology applicable in electric machines, including spoke-type Interior Permanent Magnet (IPM) machines and Synchronous Reluctance machines, that reduces torque ripple in electric machines.

The design may be used in electric motors having distributed windings while reducing the complexity in manufacturing. The methodology aims at torque ripple by reconsidering special slot per pole per phase combinations which are achieved by stators with specific number of slots combined with the segmented spoke rotor. Another aspect of the methodology aims at torque ripple by configuring the shape of the exterior surface of the rotor spokes and/or the gap between the rotor spokes and stator. Embodiments of the invention may employ either or both aspects in effectively reducing torque ripple in electric machines.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
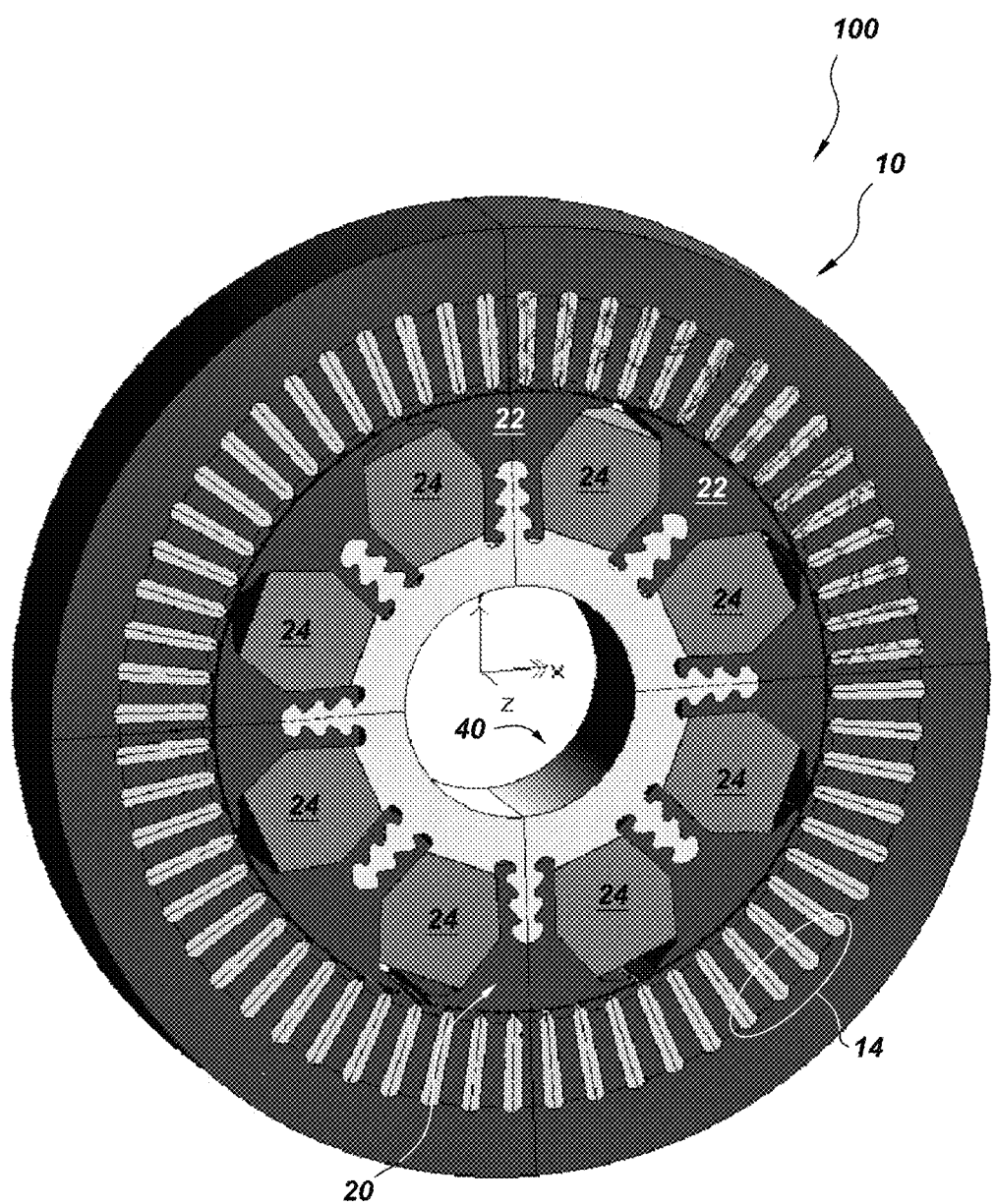
FIG. 1 is a cross-sectional view of a rotor and stator assembly of a spoke-type IPM machine in accordance with an exemplary embodiment of the invention.

Referring to FIG. 1, a front perspective view of an assembly 100 is depicted. The assembly 100 comprises a stator assembly 10 surrounding a rotor assembly 20, further surrounding a shaft or axle 40. As depicted, the rotor assembly 20 is typically disposed inside a cavity defined by the surrounding stator assembly 10. The assembly 100 may function as an electric machine and, as such, the rotor assembly 20 may rotate about a center axis (marked "z"), thereby ultimately providing rotational energy at shaft 40. The electric machine 100 or assembly may be used in a variety of applications, including, but not limited to, traction drive motors for vehicles including Off Highway vehicles (OHV), mining vehicles, and the like.

The stator assembly 10 may comprise a stator core 12 having a plurality of stator teeth interspersed amongst a plurality of stator slots 14 together configured with stator windings (not shown) to generate a stator magnetic field when excited with alternating current (AC). The stator core 12 extends along the longitudinal axis ("z"). The inner surface of the stator core 12 defines a cavity. The stator assembly 10 includes M slots, wherein M is a quantity of slots. M can be virtually any even integer. In certain embodiments, M may be, for example, 36, 54, 60, and the like.

The rotor assembly 20 is disposed inside the cavity and is configured to rotate about the longitudinal axis and the shaft 40. The rotor assembly 20 has N poles, wherein N is a quantity of poles. The rotor assembly 20 comprises a rotor core 22 located circumferentially around the shaft 40. N can be virtually any even integer≥2. In certain embodiments, N may be, for example, 8, 12, and the like.

The rotor assembly 20 may include a plurality of spokes 22 that form part of the rotor core. In that FIG. 1 depicts an IPM machine, the rotor assembly 20 further comprises a plurality of magnets 24 that are distributed axially and interspersed with the spokes 22 as shown.

The rotor assembly 20 and stator assembly 10 collectively comprise an electric machine 100 that has X phases. A common value for X in electric machine 100 embodiments is 3 (three) phases.

The electric machine 100 is configured having M slots, N poles, and X phases, such that a value k, wherein k=M/(X*N), wherein k is a non-integer. In embodiments, the electric machine 100 is configured where k=Y.5, wherein Y is an integer. In other embodiments, the electric machine 100 is configured such that Y.3≤k≤Y.7, wherein Y is an integer.

As indicated, while certain values of k may have advantages, other values for k may be used. For example, it has been discovered that the value k=Y.5 has certain advantages with regards to lowering torque ripple. However, values of k other than Y.5 (e.g., Y.3≤k≤Y.4 or Y.6≤k≤Y.7) may be used. In these particular embodiments, the reduction of torque ripple may be accompanied by additional core losses. To counter the core losses various cooling means may be used to counter the core losses including, for example, cooling portions of the rotor with air or liquid cooling.

Thus, by example and not by limitation, embodiments of electric machines 100 may have in an embodiment 8 poles, 36 slots, and 3 phases, thereby k=1.5. In another embodiment, the electric machine 100 may have 12 poles, 54 slots, 3 phases, thereby k=1.5. In another embodiment, the electric machine 100 may have 8 poles, 60 slots, 3 phases, thereby k=2.5. In another embodiment, the electric machine 100 may have 10 poles, 75 slots, 3 phases, thereby k=2.5. Other combinations are possible without departing from aspects of the present invention.

For example, and not by limitation, the embodiment shown in FIG. 1 is a 3 phase (i.e., X=3) electric machine 100 having 60 slots (i.e., M=60) and 8 poles (i.e., N=10).

Figure 2:
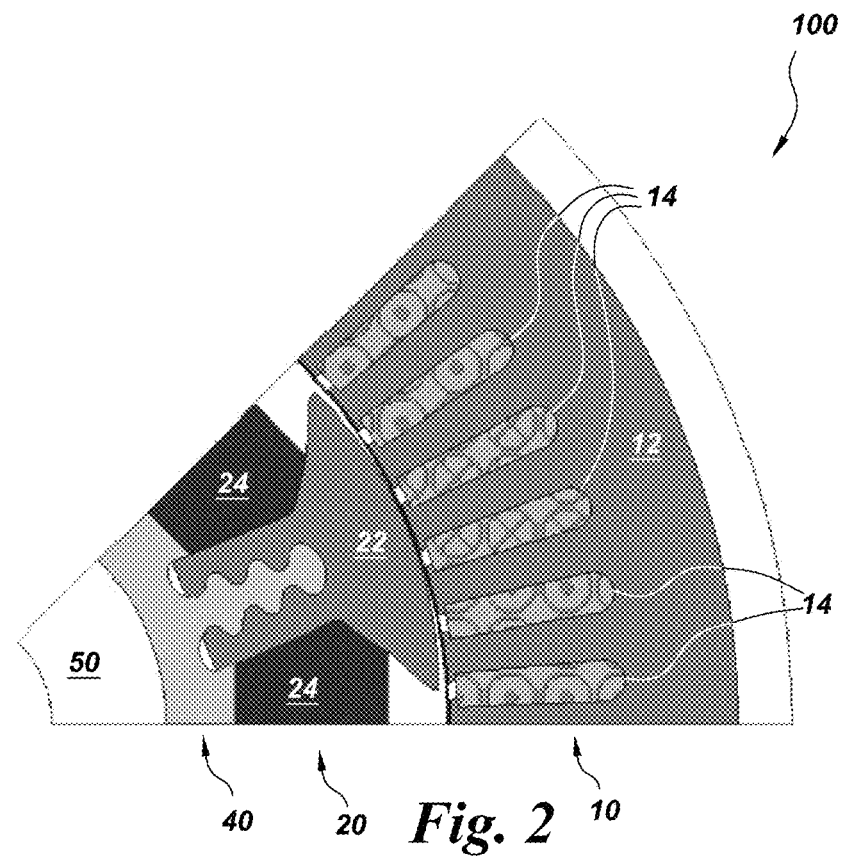
FIG. 2 is a close up cross-sectional view of a single pole portion of a rotor and stator assembly of a spoke-type IPM machine in accordance with another embodiment of the invention.
Figure 3:
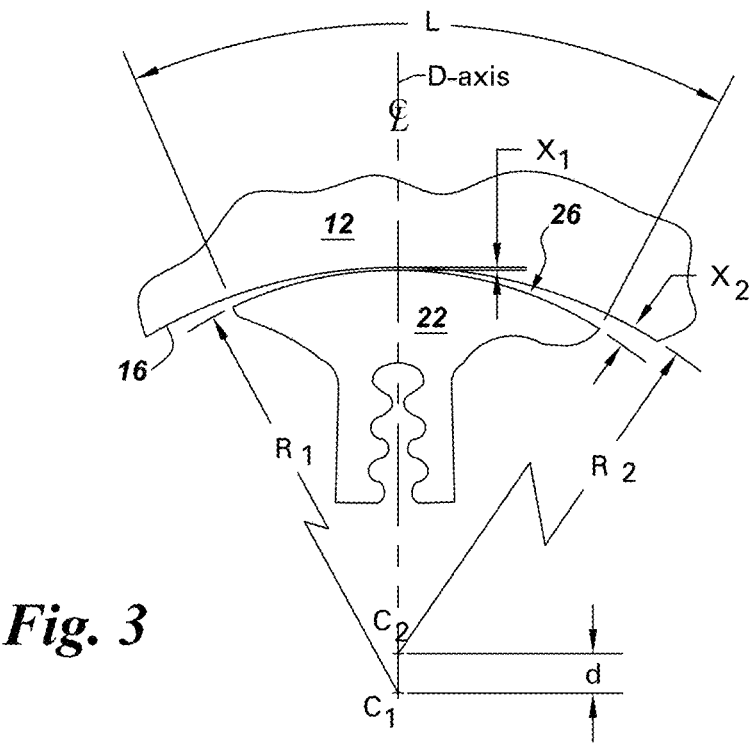
FIG. 3 is a further close up cross-sectional schematic view of the single pole stator rotor interface depicted in FIG. 2.

Referring to the close up views provide in both FIGS. 2 and 3, another aspect of the present invention can be applied alone or in combination with the aforementioned aspects in order to aid in reduction of torque ripple in an electric machines. FIGS. 2 and 3 depicted only a single-pole portion of another embodiment of a rotor and stator interface; and, do not, for example, shown magnets 24 for clarity purposes only. As shown, an inner surface 16 of the stator assembly 10 faces the outer surface 26 of the spokes 22 of the rotor assembly 20. A gap is defined between the inner surface 16 and the outer surface 26. The gap is non-uniform along the length (denoted by "L") of the outer surface 26. As shown in FIG. 3, the distance of the gap may be $X_1$ at a midpoint, along the D-axis, of the spoke 22 and may be $X_2$ at ends of spoke 22, wherein $X_1 > X_2$. The difference in gap along the spoke 22 may be provided, for example, by a different in centerpoints of the curvature of the inner surface 16 and the outer surface 26. As shown, the inner surface 16 has a curvature having a radius $R_1$ and centerpoint $C_1$. Similarly, outer surface 26 has a curvature having a radius $R_2$ and centerpoint $C_2$. The electric machine 100 may be configured such that $C_2 \neq C_1$. In this manner, the gap along the length of the spoke 22 between outer surface 26 and inner surface 16 is non-uniform.

By providing a non-uniform gap along length, L, of outer surface 26, a more sinusoidal magnets field is provide in the gap, ultimately assisting in reducing torque ripple in the electric machine 100. The configuration of the outer surface 26 may vary, depending on embodiment. For example, the outer surface 26 of the spoke 22 in FIGS. 2 and 3 is a continuous, convex curve. Other curved shapes and configurations may be used. In still other embodiments, the outer surface 26 need not be curved. For example, the outer surface 26 may instead be angular, straight, segmented, and the like. The midpoint of the length, L, of the outer surface 26, which corresponds with the D-axis, may be the closest point of the outer surface 26 to the inner surface 16 of the stator 12.

For example, and not by limitation, the embodiment shown in FIGS. 2 and 3 may be in a 3 phase (i.e., X=3) electric machine 100 having 48 slots (i.e., M=48) and 8 poles (i.e., N=8). Thus, in the embodiment shown in FIGS. 2 and 3, the k value would happen to be 2.0.

The value of $X_1$, $X_2$, $C_1$, $C_2$, $R_1$, and $R_2$ will vary depending on the particular electric machine 100. Examples of typical values of $X_1$ are of the magnitude in a range from about 0.5 mm to about 1.2 mm. Similarly, examples of typical values of $X_2$, in embodiments when $X_2 > X_1$, are of the magnitude in a range from about 1.5 mm to about 4.0 mm. Examples of typical values of $R_1$ and $R_2$ are in a range from about 20 mm to about 300 mm. Other values may be used without departing from scope.

The electric machine 100 may be a variety of electric machines. Although the figures show magnets 24 in the rotor assembly 20, magnets need be used. For example, the electric machine 100 may be a spoke-type IPM machine (i.e., with magnets 24), a Synchronous Reluctance machine (i.e., without magnets), and the like.

The electric machines, as described above, may be well suited for various applications including, for example, traction motors on various vehicles. However, such electric machines may be employed in a variety of other applications. The electric machines can also be used for other non-limiting examples such as traction applications, wind and gas turbines, starter-generators for aerospace applications, industrial applications, appliances, and the like.

Therefore, in accordance with an embodiment of the invention, an electric machine, having X phases, comprises a stator assembly comprising a stator core, the stator core comprising a plurality of stator teeth, the stator assembly is further configured with stator windings to generate a stator magnetic field when excited with alternating currents and extends along a longitudinal axis with an inner surface defining a cavity, said stator assembly having M slots; and a rotor assembly disposed inside said cavity and configured to rotate about the longitudinal axis, said rotor assembly having N poles, wherein the rotor assembly comprises: a shaft; a rotor core located circumferentially around the shaft; and a plurality of permanent magnets disposed between the stacks and are configured to generate a magnetic field, which magnetic field interacts with the stator magnetic field to produce a torque, and further wherein the electric machine comprises a spoke-type Interior Permanent Magnet (IPM) machine and is configured such that a value $k=M/(X*N)$ wherein k is a non-integer>about 1.3.

In accordance with another embodiment, spoke-type internal permanent magnet (IPM) machine having X phases comprises a stator assembly comprising a stator core, the stator core comprising a plurality of stator teeth, the stator assembly having M slots, the stator assembly is further configured with stator windings to generate a magnetic field when excited with alternating currents and extends along a longitudinal axis with an inner surface defining a cavity; and a rotor assembly comprising a rotor core, the rotor assembly having N poles, the rotor assembly disposed inside said cavity and configured to rotate about the longitudinal axis, wherein the rotor assembly further comprises: a shaft; and a plurality of permanent magnets disposed in the rotor core and are configured to generate a magnetic field, which magnetic field interacts with the stator magnetic field to produce a torque, wherein the stator assembly having an inner curved surface, the rotor assembly comprising a plurality of spokes having an outer surface facing the inner curved surface, defining a gap therebetween, wherein the gap has a non-uniform distance along a length of the outer surface.

In accordance with an exemplary embodiment, a electric machine, having X phases, comprises a stator assembly comprising a stator core, the stator core comprising a plurality of stator teeth, the stator assembly is further configured with stator windings to generate a stator magnetic field when excited with alternating currents and extends along a longitudinal axis with an inner surface defining a cavity, said stator assembly having M slots; and a rotor assembly disposed inside said cavity and configured to rotate about the longitudinal axis, said rotor assembly having N poles, wherein the rotor assembly comprises: a shaft; and a rotor core located circumferentially around the shaft, further wherein the electric machine comprises a Synchronous Reluctance machine and is configured such that a value $k=M/(X*N)$ wherein k is a non-integer>about 1.3.

In accordance with an exemplary embodiment, a Synchronous Reluctance machine having X phases comprises a stator assembly comprising a stator core, the stator core comprising a plurality of stator teeth, the stator assembly having M slots, the stator assembly is further configured with stator windings to generate a magnetic field when excited with alternating currents and extends along a longitudinal axis with an inner surface defining a cavity; and a rotor assembly comprising a rotor core and shaft, the rotor assembly having N poles, the rotor assembly disposed inside said cavity and configured to rotate about the longitudinal axis, wherein the stator assembly having an inner curved surface, the rotor assembly comprising a plurality of spokes having an outer surface facing the inner curved surface, defining a gap therebetween, wherein the gap has a non-uniform distance along a length of the outer surface.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. An electric machine, having X phases, comprising:
   a stator assembly comprising a stator core, the stator core comprising a plurality of stator teeth, the stator assembly is further configured with stator windings to generate a stator magnetic field when excited with alternating currents and extends along a longitudinal axis with an inner surface defining a cavity, said stator assembly having M slots; and
   a rotor assembly disposed inside said cavity and configured to rotate about the longitudinal axis, said rotor assembly having N poles, wherein the rotor assembly comprises:
      a shaft;
      a rotor core located circumferentially around the shaft; and
      a plurality of permanent magnets disposed between the stacks and are configured to generate a magnetic field, which magnetic field interacts with the stator magnetic field to produce a torque,
   wherein the electric machine comprises a spoke-type Interior Permanent Magnet (IPM) machine and is configured such that a value $k=M/(X*N)$ wherein k is a non-integer>about 1.3.
2. The electric machine according to claim 1, further wherein k is Y.5, wherein Y is an integer.

3. The electric machine according to claim 1, further wherein Y.3≤k≤Y.7, wherein Y is an integer, further wherein k≠Y.5.

4. The electric machine of claim 1, the stator assembly having an inner curved surface having a center, $C_1$, the rotor assembly comprising a plurality of spokes having an outer curved surface having a center, $C_2$, wherein $C_1 \neq C_2$.

5. The electric machine of claim 1, the stator assembly having an inner curved surface, the rotor assembly comprising a plurality of spokes having an outer surface facing the inner curved surface, defining a gap therebetween, wherein the gap has a non-uniform distance along a length of the outer surface.

6. The electric machine of claim 5, wherein the outer surface is curved.

7. A vehicle comprising the electric machine of claim 1 and a vehicle support structure attached thereto.

8. A spoke-type internal permanent magnet (IPM) machine having X phases comprising:
a stator assembly comprising a stator core, the stator core comprising a plurality of stator teeth, the stator assembly having M slots, the stator assembly is further configured with stator windings to generate a magnetic field when excited with alternating currents and extends along a longitudinal axis with an inner surface defining a cavity; and
a rotor assembly comprising a rotor core, the rotor assembly having N poles, the rotor assembly disposed inside said cavity and configured to rotate about the longitudinal axis, wherein the rotor assembly further comprises:
a shaft; and
a plurality of permanent magnets disposed in the rotor core and are configured to generate a magnetic field, which magnetic field interacts with the stator magnetic field to produce a torque, wherein the stator assembly having an inner surface having a curvature having a first radius R1 with a first centerpoint C1, the rotor assembly comprising a plurality of spokes having an outer surface having a second radius R2 with a second centerpoint C2 facing the inner curved surface, and wherein a difference between the first centerpoint C1 of the inner surface and the second centerpoint C2 of the outer surface defines a gap between the inner surface and the outer surface having a non-uniform distance along a length of the outer surface.

9. The spoke-type IPM machine of claim 8, further wherein the IPM machine is configured and is configured such that a value k=M/(X*N) wherein k is a non-integer>about 1.3.

10. The spoke-type IPM machine of claim 9, further wherein k=Y.5, wherein Y is an integer.

11. The spoke-type IPM machine of claim 9, w further wherein herein Y.3≤k≤Y.7, wherein Y is an integer further wherein k≠Y.5.

12. A vehicle comprising the spoke-type IPM machine of claim 8 and a vehicle support structure attached thereto.

13. An electric machine, having X phases, comprising:
a stator assembly comprising a stator core, the stator core comprising a plurality of stator teeth, the stator assembly is further configured with stator windings to generate a stator magnetic field when excited with alternating currents and extends along a longitudinal axis with an inner surface defining a cavity, said stator assembly having M slots; and
a rotor assembly disposed inside said cavity and configured to rotate about the longitudinal axis, said rotor assembly having N poles, wherein the rotor assembly comprises:
a shaft; and
a rotor core located circumferentially around the shaft,
wherein the electric machine comprises a Synchronous Reluctance machine and is configured such that a value k=M/(X*N) wherein k is a non-integer>about 1.3.

14. The electric machine according to claim 13, further wherein k is Y.5, wherein Y is an integer.

15. The electric machine according to claim 13, further wherein Y.3≤k≤Y.7, wherein Y is an integer further wherein k≠Y.5.

16. The electric machine of claim 13, the stator assembly having an inner curved surface having a center, $C_1$, the rotor assembly comprising a plurality of spokes having an outer curved surface having a center, $C_2$, wherein $C_1 \neq C_2$.

17. The electric machine of claim 13, the stator assembly having an inner curved surface, the rotor assembly comprising a plurality of spokes having an outer surface facing the inner curved surface, defining a gap therebetween, wherein the gap has a non-uniform distance along a length of the outer surface.

18. The electric machine of claim 17, wherein the outer surface is curved.

19. A vehicle comprising the electric machine of claim 13 and a vehicle support structure attached thereto.

20. A Synchronous Reluctance machine having X phases comprising:
a stator assembly comprising a stator core, the stator core comprising a plurality of stator teeth, the stator assembly having M slots, the stator assembly is further configured with stator windings to generate a magnetic field when excited with alternating currents and extends along a longitudinal axis with an inner surface defining a cavity; and
a rotor assembly comprising a rotor core and shaft, the rotor assembly having N poles, the rotor assembly disposed inside said cavity and configured to rotate about the longitudinal axis,
wherein the stator assembly having an inner curved surface having a curvature having a first radius R1 with a first centerpoint C1, the rotor assembly comprising a plurality of spokes having an outer surface having a second radius R2 with a second centerpoint C2 facing the inner curved surface, and wherein a difference between the first centerpoint C1 of the inner surface and the second centerpoint C2 of the outer surface defines a gap between the inner surface and the outer surface having a non-uniform distance along a length of the outer surface.

21. The Synchronous Reluctance machine according to claim 20, further wherein the Synchronous Reluctance machine is configured such that a value k=M/(X*N) wherein k is non-integer>about 1.3.

22. The Synchronous Reluctance machine according to claim 21, further wherein k is Y.5, wherein Y is an integer.

23. The Synchronous Reluctance machine according to claim 21, further wherein Y.3≤k≤Y.7, wherein Y is an integer further wherein k≠Y.5.

24. A vehicle comprising the Synchronous Reluctance machine of claim 20 and a vehicle support structure attached thereto.

* * * * *